US012603825B2

(12) United States Patent
Gotwals et al.

(10) Patent No.: US 12,603,825 B2
(45) Date of Patent: Apr. 14, 2026

(54) MULTI-INSTRUMENT, MULTI-TECHNICIAN, AND MULTI-JOB INTEGRATION IN A TEST PROCESS AUTOMATION SYSTEM FOR NETWORKS

(71) Applicant: Viavi Solutions Inc., Chandler, AZ (US)

(72) Inventors: Michael D. Gotwals, Indianapolis, IN (US); Walter L. Miller, Indianapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 520 days.

(21) Appl. No.: 18/174,196

(22) Filed: Feb. 24, 2023

(65) Prior Publication Data

US 2024/0291746 A1 Aug. 29, 2024

(51) Int. Cl.
H04L 12/00 (2006.01)
H04L 43/50 (2022.01)

(52) U.S. Cl.
CPC ................................... H04L 43/50 (2013.01)

(58) Field of Classification Search
CPC .......................................................... H04L 43/50
USPC ........................................................... 370/241
See application file for complete search history.

(56) References Cited

U.S. PATENT DOCUMENTS 6,473,664 B1 * 10/2002 Lee ................... G05B 19/41865
700/110
6,687,834 B1 * 2/2004 Morales, Jr. ........ G06F 11/3684
705/50

7,042,243 B2 * 5/2006 Matsumoto ........ G01R 31/2851
324/762.01
8,042,089 B2 * 10/2011 Ousterhout ............ G06Q 10/06
717/101
8,516,370 B2 * 8/2013 Duffie ................. G06F 11/3684
715/704
9,521,564 B2 * 12/2016 Zhao ................... G06F 11/3698
10,416,630 B2 * 9/2019 De ....................... G06F 13/4068
10,936,396 B2 * 3/2021 Rondeau ............. G06F 11/2273
11,288,178 B2 * 3/2022 Benes ................. G06F 9/45558
11,977,470 B2 * 5/2024 Kunnath ............. G06F 11/3013
2004/0268182 A1 * 12/2004 Liu ...................... G06F 11/006
714/38.1

(Continued)

FOREIGN PATENT DOCUMENTS

| | | | | |
|---|---|---|---|---|
| CA | 3034830 A1 * | 12/2019 | .......... | G06F 11/0793 |
| CN | 111695771 B * | 2/2024 | ....... | G06Q 10/06395 |
| TW | 201324142 A * | 6/2013 | ....... | G06Q 10/06395 |

*Primary Examiner* — Frantz Coby
(74) *Attorney, Agent, or Firm* — DLA PIPER LLP US

(57) ABSTRACT

A multi-job, multi-job, multi-technician test process automation system is provided. The test process automation system allows a supervisory user to define and assign multiple jobs, where each job may include multiple tests. The jobs may be assigned to different technicians and or different testing devices. Once the tests are performed, the test process automation system may determine whether the test were performed properly. The test process automation system may further determine whether the testing devices have required configuration parameters and may additionally generate reports and business intelligence. The test automation system may be applied to any kind of modern network, including but not limited to, 5G, PON, cable, DSL, transport, and or any other type of network.

18 Claims, 15 Drawing Sheets

(56)                    References Cited

U.S. PATENT DOCUMENTS

| | | | | |
|---|---|---|---|---|
| 2008/0098369 A1* | 4/2008 | Ousterhout | ............... | G06F 8/71 |
| | | | | 717/139 |
| 2008/0148219 A1* | 6/2008 | Ousterhout | .............. | G06F 8/71 |
| | | | | 717/101 |
| 2008/0221824 A1* | 9/2008 | Kumaki | .................. | G06F 11/26 |
| | | | | 714/E11.159 |
| 2009/0192642 A1* | 7/2009 | Conrad | ................. | G06Q 10/06 |
| | | | | 700/100 |
| 2011/0314344 A1* | 12/2011 | Okamoto | ............... | H04L 41/22 |
| | | | | 714/E11.178 |
| 2015/0149107 A1* | 5/2015 | Shah | ....................... | H04L 43/50 |
| | | | | 702/122 |
| 2015/0301071 A1* | 10/2015 | Dhan | ................. | G01R 31/2834 |
| | | | | 702/108 |
| 2017/0357253 A1* | 12/2017 | Kilpatrick | .......... | G05B 19/0428 |
| 2019/0384664 A1* | 12/2019 | Rondeau | ............. | G06F 11/0709 |
| 2024/0090154 A1* | 3/2024 | Harvey | ................... | H04B 3/46 |
| 2024/0256431 A1* | 8/2024 | Balgi | ................. | G06F 11/3684 |

* cited by examiner

100

200

300a

300b

300c

300d

400c

400b

400a

400e

400d

← Active Job
502

Sync with Job Tracking Module
512

Create a job on the instrument
510

Each job shows Progress
504

Archive (hide) Jobs
508

Full list of Jobs assigned to this tech
506

500a

500b

500c

600

700

MULTI-INSTRUMENT, MULTI-TECHNICIAN, AND MULTI-JOB INTEGRATION IN A TEST PROCESS AUTOMATION SYSTEM FOR NETWORKS

BACKGROUND

Networks form a vital part of the modern economy. For example, there are cable networks that support broadband Internet, cable television, and telephone lines. Furthermore, there are other types of networks such as 5G, passive optical network (PON), direct subscriber line (DSL), Transport network, etc. All of these networks support different types of communication in the modern information technology highway. It is therefore critical that these networks are adequately maintained, tested, or otherwise kept in good working order for the modern economy and modern lives to function.

Needless to say, networks are incredibly complex: a typical network comprises a plethora of components such as antennas, switches, repeaters, and routers; and cables such as fiber optics and copper wires. Different instruments are used for testing these different components and cables. Additionally, a single component or cable may require multiple testing devices to perform different tests on it. Furthermore, the components and cables are geographically distributed such that a logistical and personnel challenge is added on top of the pure technical challenge of performing the tests properly. The testing instruments also may have to be periodically calibrated and configured to ensure that they are operating properly. Currently available test process automation systems for networks do not provide an integrated functionality that incorporate all of these variables and factors. As such, a significant improvement in test process automation systems is desired.

SUMMARY

Embodiments disclosed herein solve the aforementioned technical problems and may provide other solutions as well. In one or more embodiments, a test process automation system that integrates multiple jobs (each comprising multiple tests), multiple testing devices, and multiple technicians is provided. A job tracking module may provide an interface to define a job and assign the job to multiple testing devices and/or technicians. The multiple testing devices in turn may be able to download the corresponding test. The job tracking module may further generate another interface for the job and corresponding tests to be tracked. Once the tests are performed, the tests results are returned by the testing devices to the job tracking module, which may determine whether the tests were performed successfully. The job tracking module may further determine whether the testing devices have the corresponding configuration parameters for the different tests. The test automation system may be applied to any kind of modern network, including but not limited to, 5G, PON, cable, DSL, transport, and or any other type of network.

In addition, a test process automation system for a network is provided. The system may comprise: one or more computers storing a job tracking module; a plurality of testing devices configured to perform a corresponding plurality of tests in the network. The job tracking module may be configured to generate a user interface to allow a supervisory user to define a job including a set of network tests to be performed by a set of testing devices. The set of testing devices may be configured to download and perform the set of network tests, and may be further configured to transmit corresponding test results to the job tracking module. The job tracking module may be further configured to determine, based on the test results, whether the set of network tests has been successfully completed.

In another embodiment, a method may be provided. The method may comprise generating, by a job tracking module, a user interface to allow a supervisory user to define a job including a set of network tests to be performed by a set of testing devices. The method may further comprise downloading and performing, by the set of testing devices, the set of network tests and may also comprise transmitting, by the set of testing devices, corresponding test results to the job tracking module. The method may further comprise determining, by the job tracking module, whether the set of network tests have been successfully completed based on the test results.

It should be understood that these drawings are merely for explaining example embodiments and therefore are not limiting.

DETAILED DESCRIPTION OF SEVERAL EMBODIMENTS

In one or more embodiments, a multi-job, multi-job, multi-technician test process automation system is provided. The test process automation system allows a supervisory user to define and assign multiple jobs, where each job may include multiple tests. The jobs may be assigned to different technicians or different testing devices. Once the tests are performed, the test process automation system may determine whether the tests were performed properly. The test process automation system may further determine whether the testing devices have required configuration parameters and may additionally generate reports and business intelligence.

The test process automation system may be applied to any kind of modern network, including but not limited to, 5G, PON, cable, DSL, transport, and or any other type of network. Modern networks generally have a convergence of different types of network technologies that converge together to provide end-to-end connectivity. Within these complex modern networks, the test process automation system may facilitate a test or a test process when needed with multiple instruments, and multiple technicians. Furthermore, the test results may be collected and correlated to provide a compliance view of the current job, regardless of the number of tests, technicians, or instruments it took to complete.

Figure 1A:
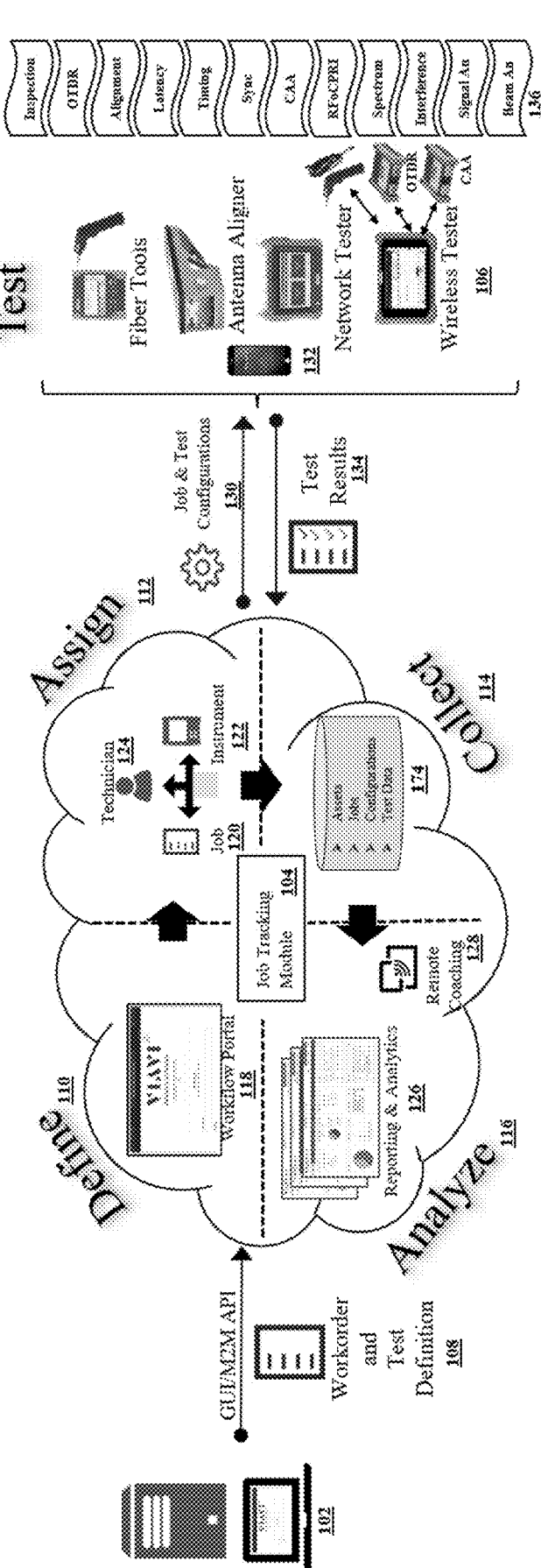
FIG. 1A shows a test process automation system based on the principles disclosed herein.

FIG. 1A shows a test process automation system 100 based on the principles disclosed herein. The test process automation system 100 may generally include a manager computing system 102 defining and assigning various network jobs, a job tracking module 104 tracking the performance of the assigned network jobs, and testing devices 106 performing the assigned network jobs. It should, however, be understood that these and other components are illustrative and should not be considered limiting. Test automation systems with additional, alternative, or a fewer number of components should be considered within the scope of this disclosure.

The manager computing system 102 may include any kind of computing devices and or systems that allow a supervisory user to define and assign different jobs in the test process automation system 100. In an embodiment, the manager computing system 102 may include a server computing system storing the software modules for defining and assigning the jobs and a computing terminal (e.g., a desktop computer, laptop computer, tablet computer, smartphone, etc.) that allows the supervisory user to access the software modules. For example, the computing terminal may render a graphical user interface (GUI) for the supervisory user to define and assign jobs. The job defining and assigning instructions may be communicated to the server computing system using, e.g., a machine to machine (M2M) application programming interface (API). As shown, a workorder and test definition 108 may be transmitted to the job tracking module 104 through the M2M API. A job (or workorder) may be generally defined as a set of individual tests to be performed by various testing devices 106.

The job tracking module 104 may form a central software suite of the test process automation system 100. For example, the job tracking module 104 may be hosted by the server computing device and be accessible to the supervisory user through the computing terminal. It should, however, be understood that the job tracking module 104 may be hosted by any number and or any kind of computing devices, which may be geographically co-located or geographically distributed. Therefore, any type of computing systems and computing networks providing the functionality of the job tracking module 104 should be considered within the scope of this disclosure.

As shown, the job tracking module 104 may provide four example functionalities: job definition 110, job assignment 112, results collection 114, and result analysis 116. It should, however, be understood that these are merely example functionalities and should not be considered limiting. For the job definition 110 functionality, the job tracking module 104 may generate a workflow portal 118, which may be rendered as the GUI in the computer terminal of the supervisory user. Using the workflow portal 118, the supervisory user may select a plurality of tests to be included in a job associated with the network, e.g., a job including various tests to be conducted on a network component. Furthermore, for the job definition 110 functionality, the supervisory user may be provided with a customized level of tracking, e.g., by controlling the granularity of the information as desired by the supervisory user.

For the job assignment 112 functionality, the job tracking module 104 may allow a job 120 and or a test to be assigned to a technician 124 or an instrument 122 (e.g., testing devices 106). For the results collection 114 functionality, the job tracking module 104 may collect data 174 from the testing devices 106. Examples of the collected data 174 may include information about the assets (e.g., testing devices 106), jobs performed, configuration of the testing devices 106, and the test data. For the result analysis 116 functionality, the job tracking module 104 may generate reporting and analytics portal 126 that may be provided to the supervisory user. The results analysis 116 functionality may further include remote coaching 128 to coach, train, or otherwise guide the technicians 124 on using the testing devices 106 to perform the various tests.

Using one or more of the various functionalities, the job tracking module 104 may transfer job and test configurations 130 to the testing devices 106 and or a technician mobile device 132. In response, the testing devices 106 and or the technician mobile device 132 may provide test results 134 to the job tracking module 104. In some embodiments, the testing devices 106 may communicate with the job tracking module 104 directly, in which case the job and test configurations 130 may be sent to the testing devices 106 directly. In other embodiments, the testing devices 106 may not necessarily have direct connectivity to the job tracking module 104, in which case the job and test configurations 130 may be sent to the technician mobile device 132, which in turn may provide the received job and test configurations 130 to the testing devices 106. Similarly, depending upon the connectivity of the testing devices 106 to the job tracking module 104, the test results 134 may be provided by the testing devices 106 to the job tracking module 104 directly or by using connectivity provided by the technician mobile device 132. As shown, example testing devices 106 may include fiber tools, antenna aligners, network testers, wireless testers (e.g., fiber bending tools, an optical time domain reflectometer (OTDR), or a cable and antenna analyzer (CAA)). The different tests 136 that are performed by the test process automation system 100 may include, for example, inspection, OTDR, antenna alignment, latency check, timing check, sync test, cable and antenna analysis, radio frequency (RF) and common public radio interface (CPRI) check, spectrum check, interference analysis, signal analysis, or beam analysis. These are just a few example tests provided by the test process automation system 100 and should not be considered limiting. Therefore, any kind of network testing should be considered within the scope of this disclosure.

The job tracking module 104 may therefore provide a centralized management mechanism for jobs definition, tracking, and analysis. For example, the job tracking module 104 may coordinate tests and results across different testing devices 106, and further show test progress and results. The job tracking module may further display a key performance indicator (KPI) dashboard (e.g., in the reporting and analytics portal 126). Additionally, the testing devices 106 may support the functionality of the job tracking module 104 and may receive, if so desired, step-by-step instructions from the job tracking module 104. Furthermore, the testing devices 106 may provide test progress and results data 134 to the job tracking module 104. In the use cases where the technician mobile device 132 is used for connectivity, a dedicated smartphone app may be provided to communicate with the testing devices 106. The use of the technical mobile device 132 and or the testing devices 106 may provide a smart access to the job tracking module 104 and may also facilitate remote coaching 128.

Figure 1B:
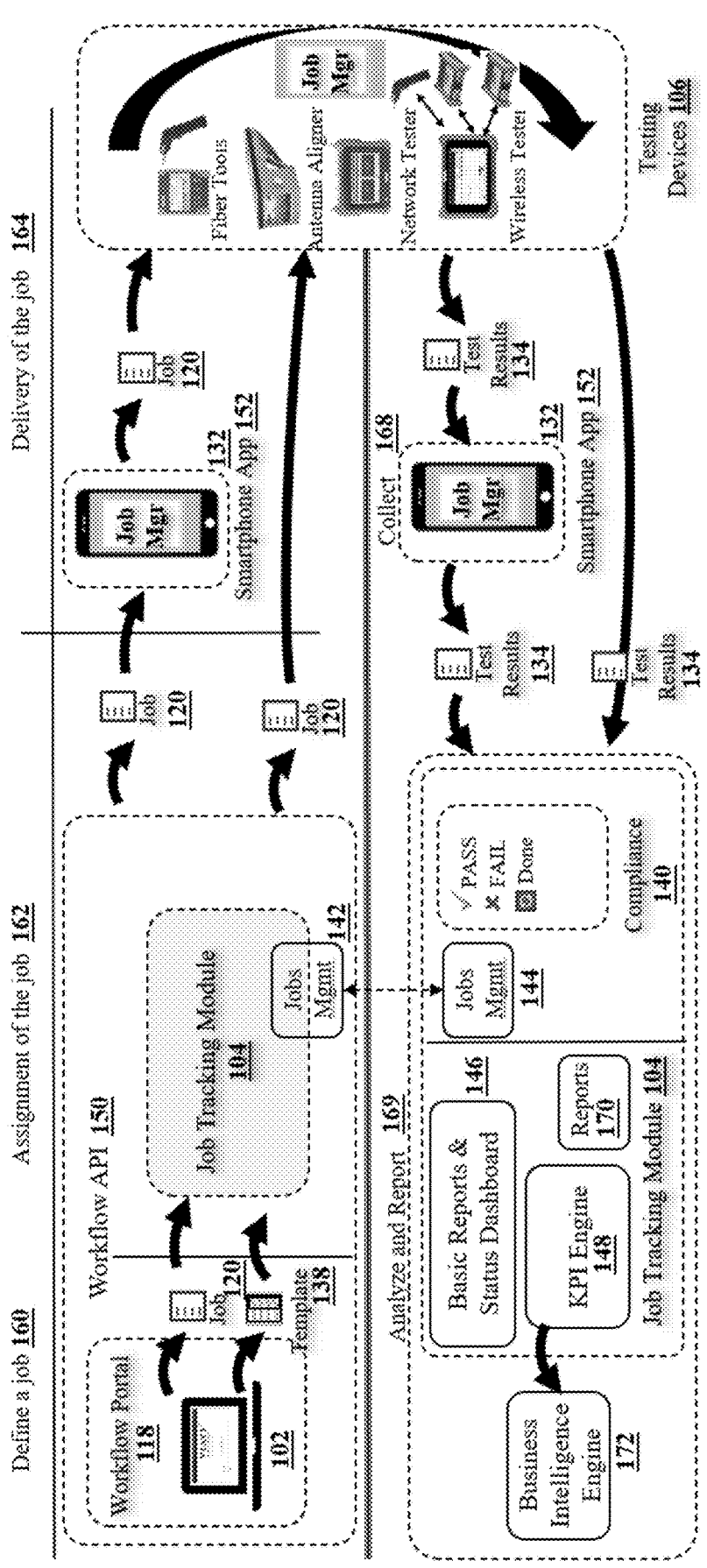
FIG. 1B shows an example end to end process flow in the example test process automation system shown in FIG. 1A based on the principles disclosed herein.

FIG. 1B shows an example end to end process flow in the example test process automation system 100 based on the principles disclosed herein. It should be understood that the process flow is merely an example and should not be considered limiting. Process flows with alternative, additional, or fewer number of steps should be considered within the scope of this disclosure.

At step 160, one or more jobs 120 may be defined. The definition of the jobs 120 may be through workflow portal 118 being displayed on a manager computing system 102. In some embodiments, the jobs 120 may be defined using a template 138, which may be pre-configured with one or more tests forming the jobs 120. The jobs 120 may be transmitted to job tracking module 104 using a workflow API 150.

At step 162, the jobs 120 may be assigned. The assignment of the jobs 120 may be to one or more technicians 124 and or to one or more testing devices 106. At step 164, the jobs 120 may be delivered to the testing devices 106 in the cases where the testing devices 106 have direct connectivity with the job tracking module 104. In other cases, the testing devices 106 may not necessarily have direct connectivity with the job tracking module 104 and the job delivery may be performed through a smartphone app 152 running on a corresponding technician mobile device 132. In these cases, the technician mobile device 132 may establish connectivity with the corresponding testing devices 106 and transmit the jobs 120 to the devices 106.

After the testing has been performed (based on the delivered jobs 120), the test results 134 may be collected at step 168. For the testing devices 106 that have direct connectivity with the job tracking module 104, the test results 134 may be directly provided by the testing devices 106 to the job tracking module 104. For the cases with no direct connectivity between the testing devices 106 and the job tracking module 104, the test results 134 may be provided by the testing devices 106 through the smartphone app 152 running on the corresponding technician mobile device 132.

At step 168, the test results 134 may be analyzed and reported. Initially, a compliance module 140 may determine whether the test results 134 indicate that a corresponding test passed (a "PASS" status) or failed (a "FAIL" status). The compliance module 140 may further check whether the corresponding test is completed (e.g., a "DONE" status) to satisfy the compliance requirement. In one or more embodiments, a job management module 142 of the job tracking module 104 may communicate with a job management module 144 of the compliance module 140 to provide a coordination between the assignment of the jobs 120 and determination of whether the corresponding jobs 120 have been completed. Such communication may allow an efficient tracking of whether the assigned jobs 120 have been completed to fulfil the compliance requirement.

In the analysis and reporting step 169, the job tracking module 104 may further provide basic reports and a status dashboard 146, which may show a snapshot view of the several jobs 120 that have been assigned, ongoing, or completed. The job tracking module 104 may further execute a key performance indicator (KPI) engine 148 that may calculate the KPIs and or determine whether the calculated KPIs meet a desired KPI criteria. Additionally, the job tracking module 104 may generate detailed reports 170 that may be provided to various stakeholders. The analysis and reporting step 169 may further include feeding the different reporting data (e.g., detailed reports 170) into a business intelligence engine 172 that may aggregate the data to generate new business insights.

Figure 1C:
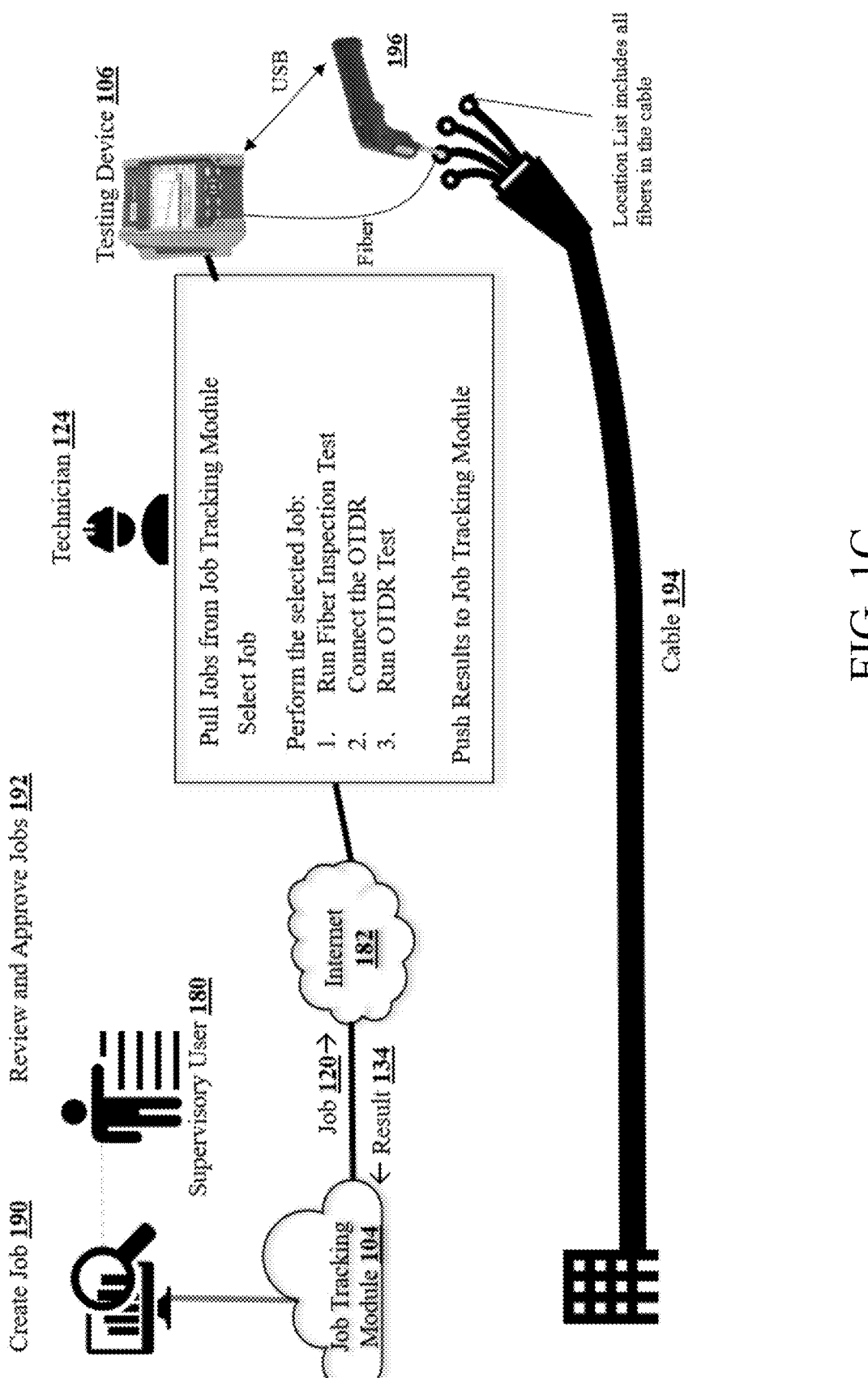
FIG. 1C shows an example use of the test process automation system shown in FIG. 1A based on the principles disclosed herein.

FIG. 1C shows an example use of the test process automation system 100 based on the principles disclosed herein. As shown, the example use may be to test a fiber optical cable 194 within any kind of modern network. It should, however, be understood that the illustrated test is an example use case and is not limiting and that any type of test should be considered within the scope of this disclosure.

In the illustrated example, a job 120 may be created at step 190. The job may be created at a workspace provide by the job tracking module 104. At step 192, the created job may be approved and or otherwise modified by a supervisory user 180. Once approved, the job may be transmitted to a technician 124 through a communication network such as the internet 182. In turn, the technician 124 may pull different jobs from the job tracking module 104 and select the job 120 created in step 190. The technician 124 may then perform the selected job 120, which may include two tests in the illustrated example. The first test may be a fiber inspection test performed by using a fiber microscope 196. The second test may be an OTDR test, which may be performed by connecting an OTDR testing device 106 to the fiber optic cable 194 via another fiber. Furthermore, the fiber microscope 196 may be connected to the OTDR testing device through a USB connection. After both tests are completed, the technician 124 may push the result 134 to the job tracking module 104. As shown, the test may be performed for all fibers in the fiber optic cable 194 and a location list associated with the job 120 may have information concerning all of the fibers.

Figure 2:
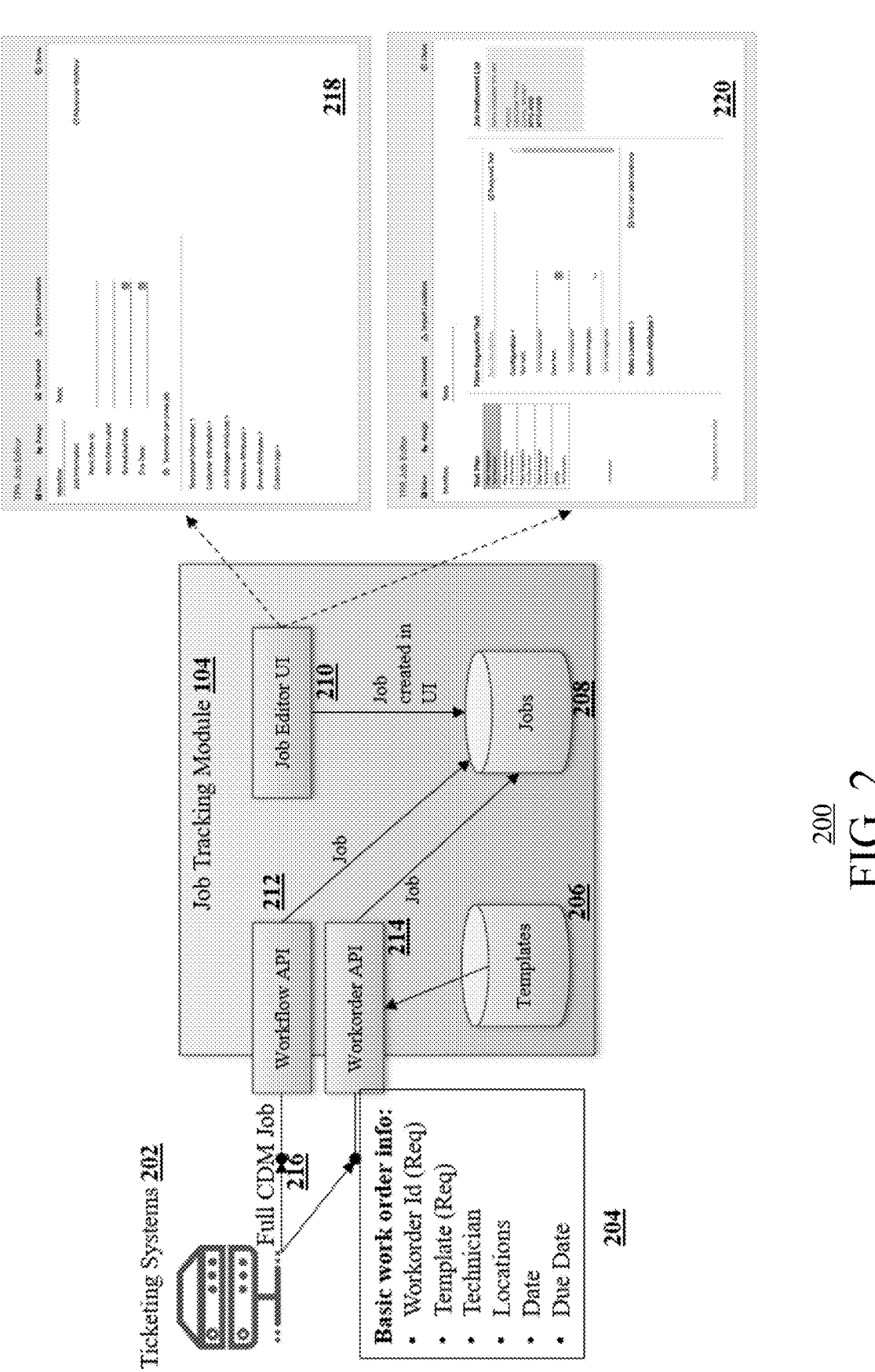
FIG. 2 shows an example architecture 200 for defining a job in a test process automation system shown in FIG. 1A based on the principles disclosed herein.

FIG. 2 shows an example architecture 200 for defining a job in a test process automation system 100 based on the principles disclosed herein. It should be understood that the architecture 200 and the components thereof are examples and should not be considered limiting. Architectures with additional, alternative, or fewer number of components should be considered within the scope of this disclosure.

As shown, the architecture 200 may include one or more job ticketing systems 202. The jobs ticketing systems 202 may allow a user (e.g., a supervisory user) to define and assign one or more jobs. In some embodiments, a defined job may include a full common data model (CDM) job 216, which may interact with a workflow API 212 of the job tracking module 104. In other words, the CDM job 216 may have complete information about the job and may not have to go through the workorder API to construct the job. In other embodiments, the job ticketing systems 202 may provide basic work order information 204 (i.e., not necessarily a full CDM). The basic work order information 204 may include, for example, workorder identification, template identification, technician identification, one or more locations where the jobs may have to be performed, current date of job creation, or due date for the job to be completed. Based on this basic work order information 204, the job tracking module 104 may retrieve a template from a templates repository 206 to define the job. Regardless of how the job is generated, each of the workflow API 212 and the workorder API 214 may push the job to the jobs repository 208.

The jobs repository 208 may populate a job editor user interface 210. Two non-limiting examples of the job editor user interface 210 are shown in FIG. 2 as UI 218 and UI 220. The job editor user interface 210 may allow the supervisory user to further edit and or otherwise customize the job before assigning it to a testing device and or a technician.

Figure 3A:
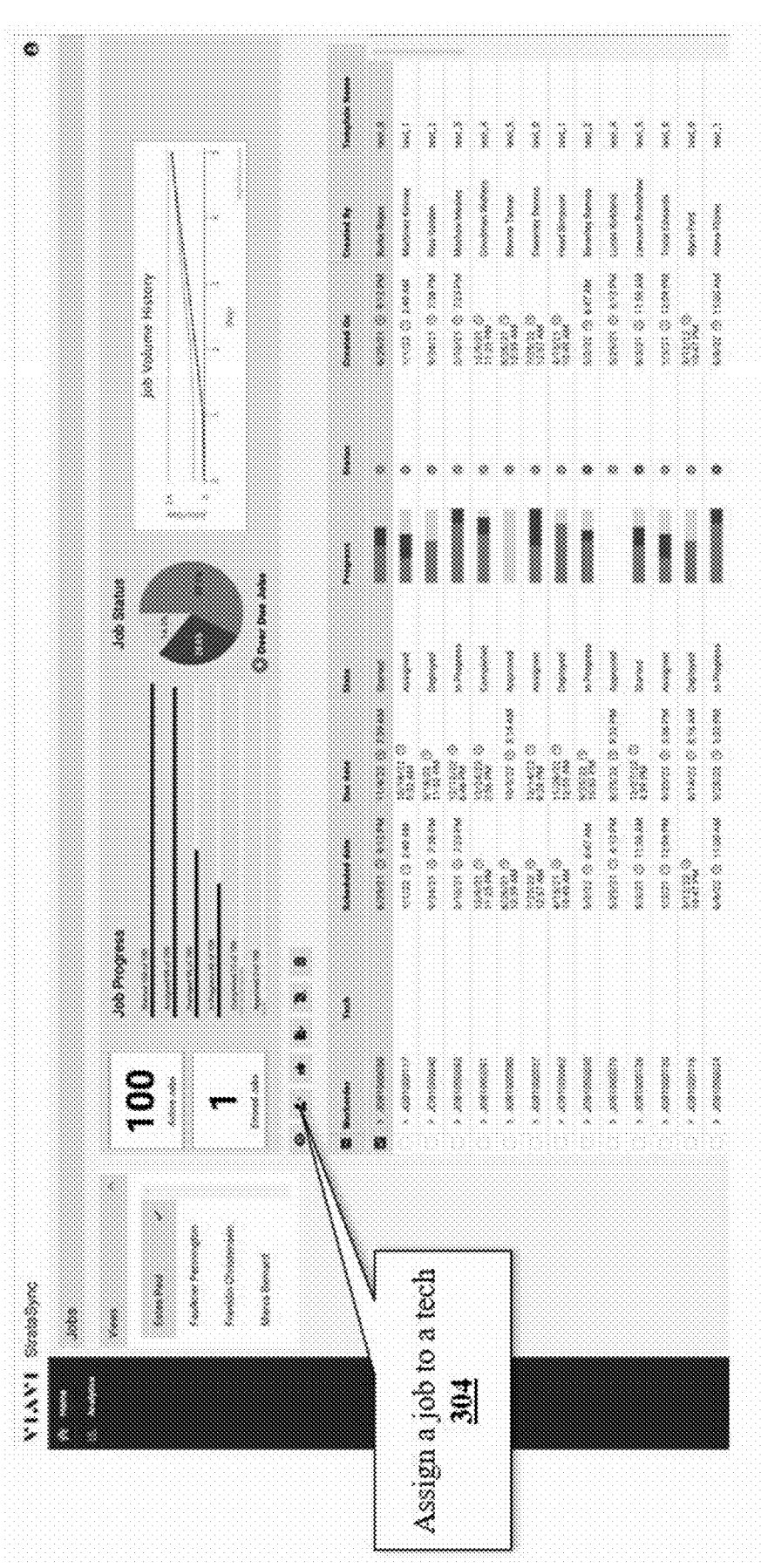
FIGS. 3A-3D show example graphical user interfaces (GUIs) generated by a job tracking module based on the principles disclosed herein.
Figure 3B:
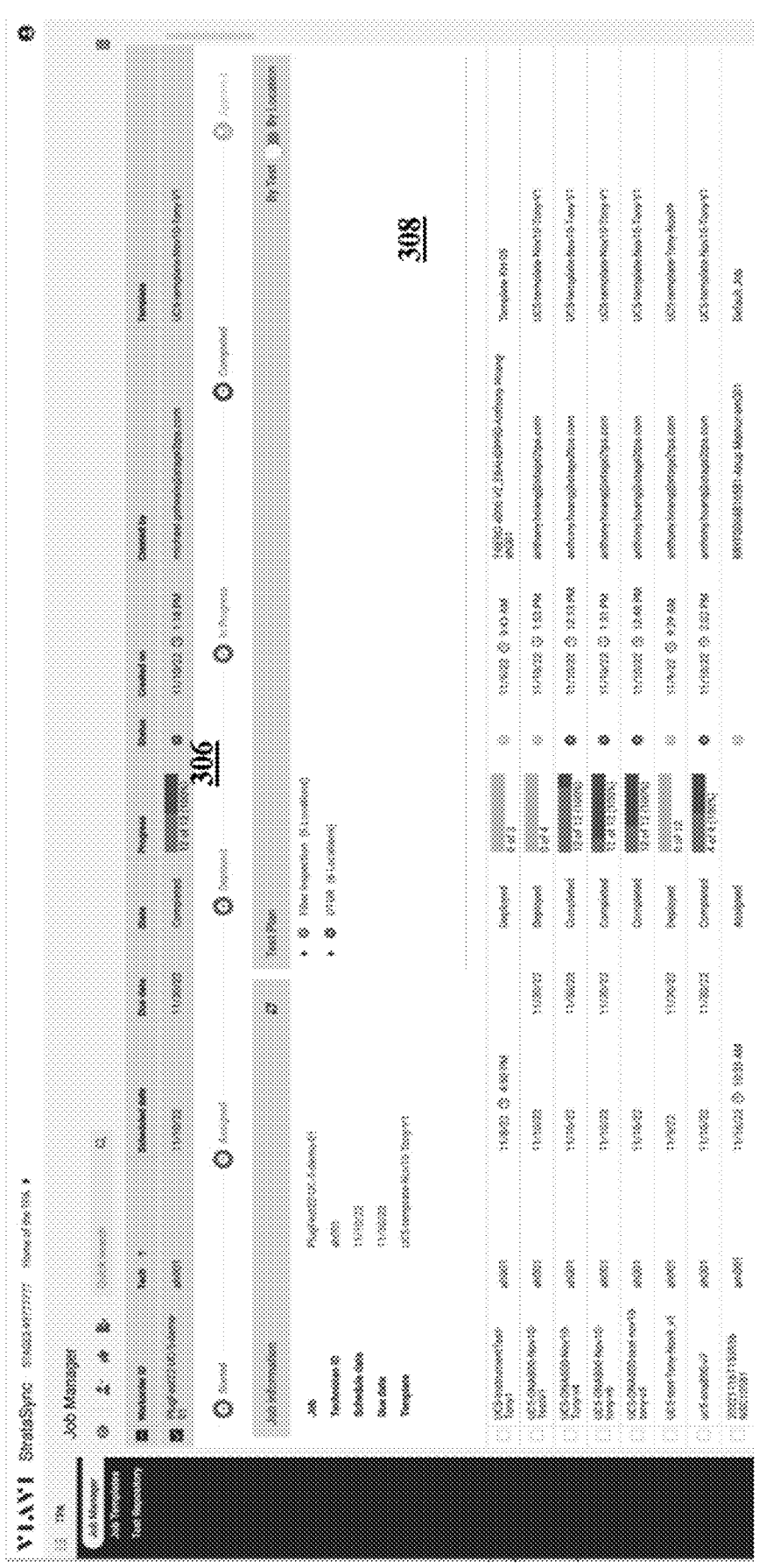
Figure 3C:
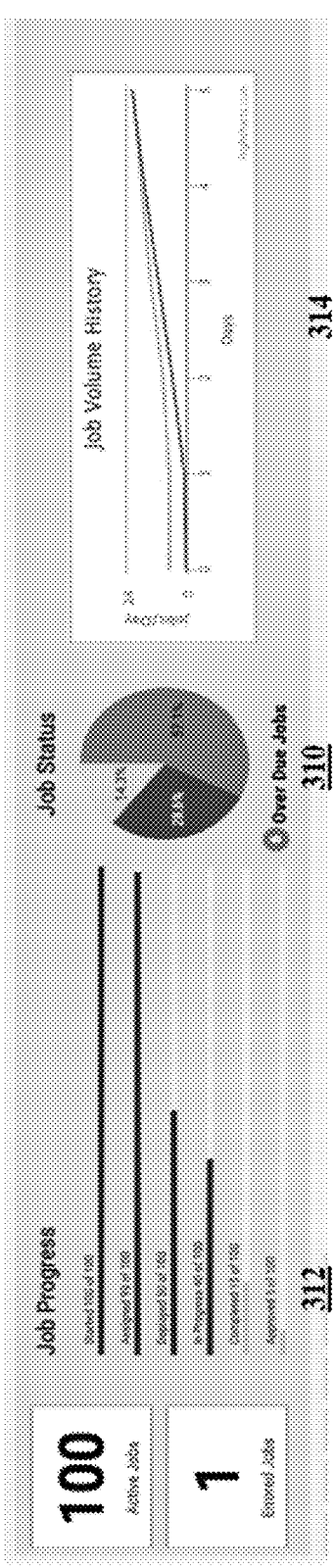
Figure 3D:
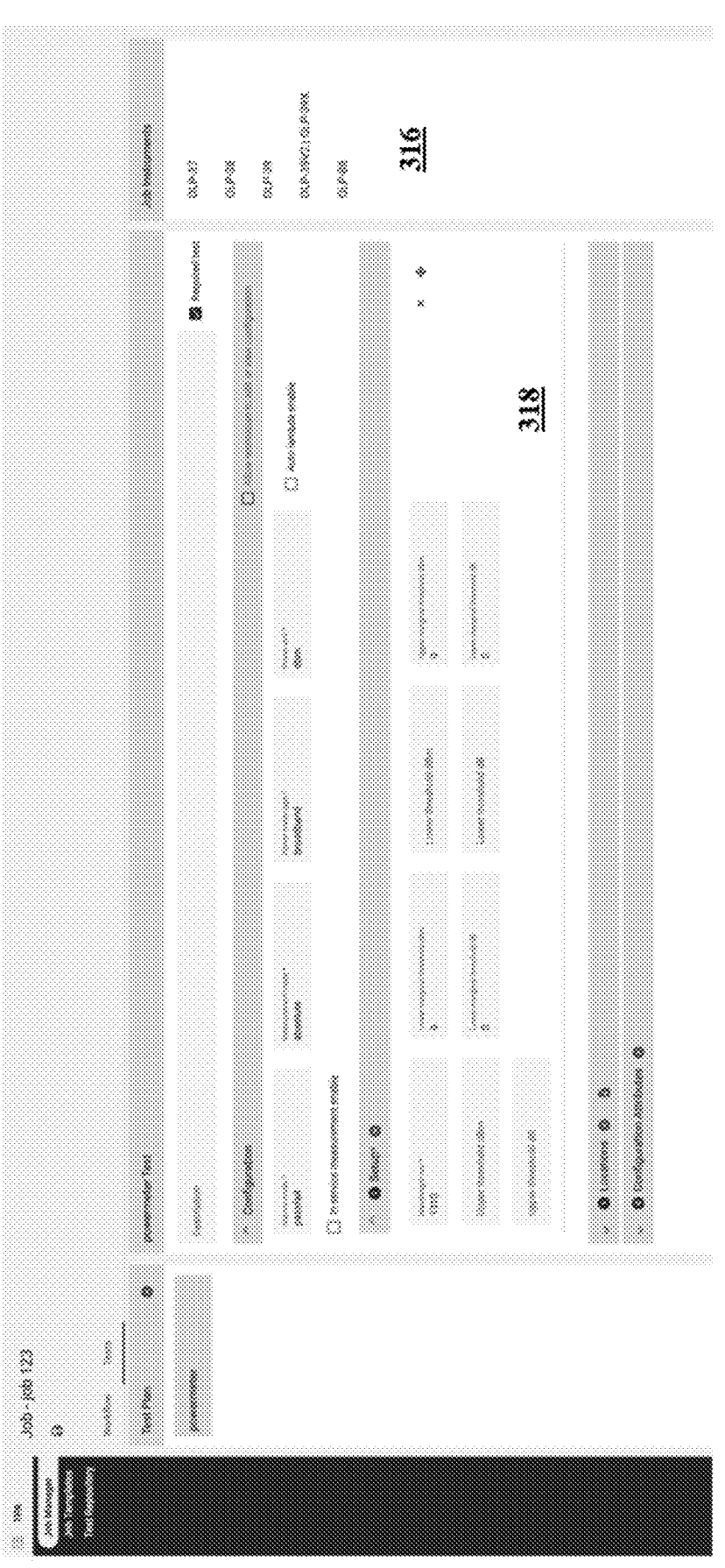

FIGS. 3A-3D show example GUIs generated by the job tracking module 104 based on the principles disclosed herein. The example GUIs may be generated in a computing device such as a desktop computer, laptop computer, or tablet computer. For example, FIG. 3A shows an example GUI 300*a* that may be used for the process of assigning a job to a technician 304. FIG. 3B shows an example GUI 300*b* that allows a user to track the progress of multiple jobs. For example, job progress may be shown using a progress bar, one of which has been labeled as 306 in the illustrated example. The example GUI 300*b* may further show details 308 of a job when selected. FIG. 3C shows an example GUI 300*c* that shows the aggregate progress of multiple jobs. As shown, the aggregate progress may be shown as progress bars 312, a pie chart 310, or a job volume history chart 314. FIG. 3D shows a GUI 300*d* for configuring a test instrument, e.g., at least one of the test instruments 316 (similar to testing devices 106 shown in FIG. 1A). Particularly, GUI 300*d* provides a window 318 for setting up various configuration parameters.

Figure 4C:
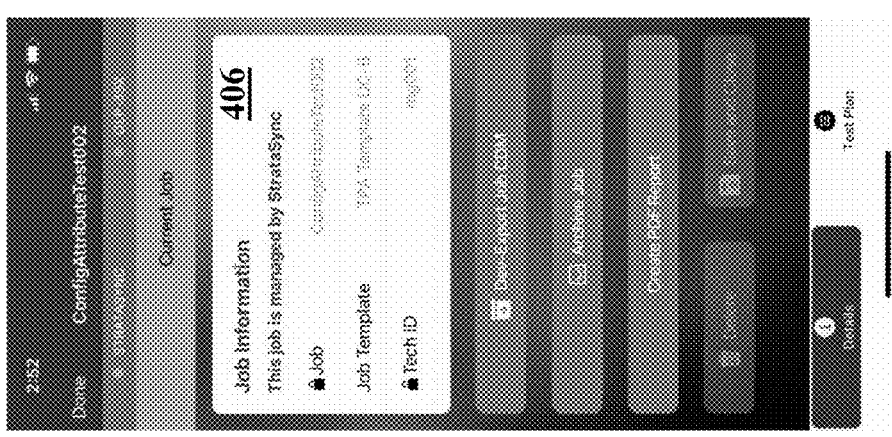
FIGS. 4A-4E show example GUIs generated by the job tracking module based on the principles disclosed herein.
Figure 4B:
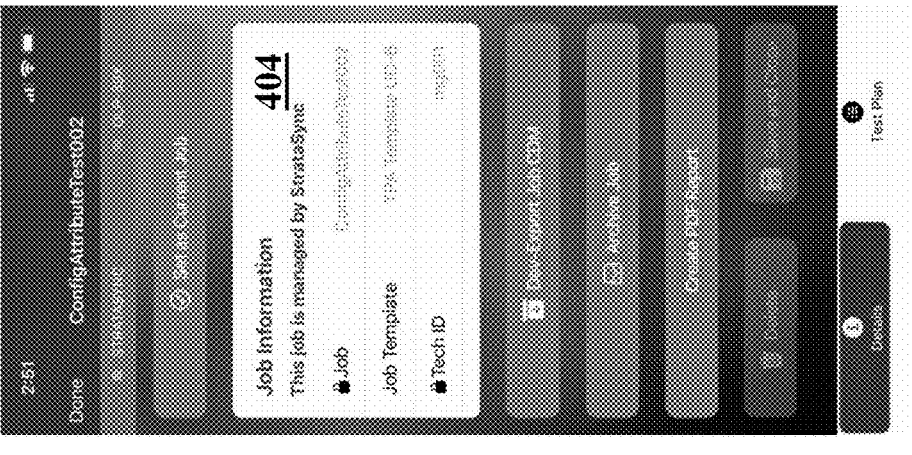
Figure 4A:
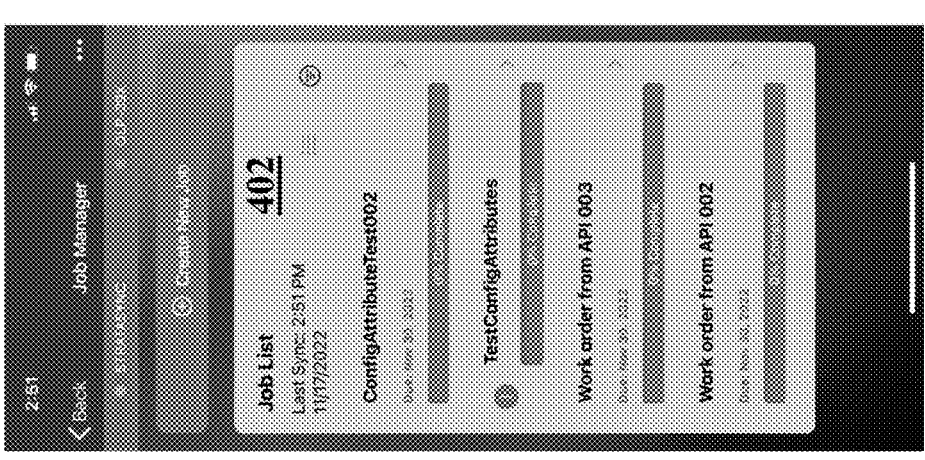
Figure 4E:
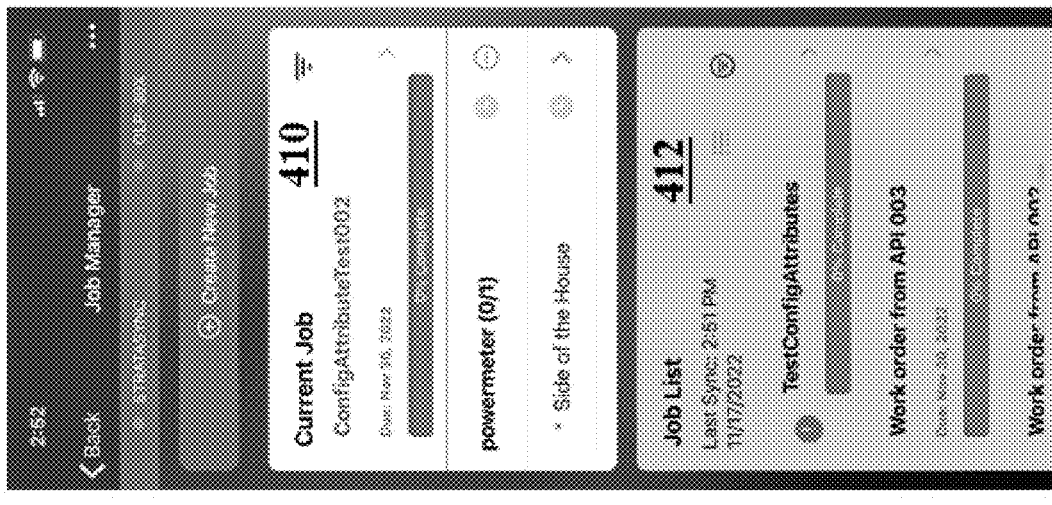
Figure 4E:
Figure 4D:
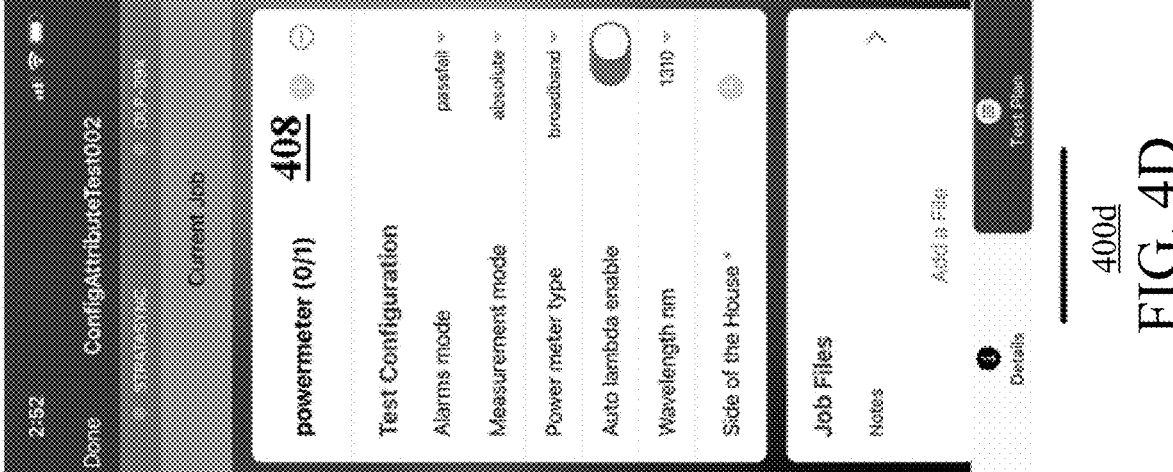

FIGS. 4A-4E show example GUIs generated by the job tracking module 104 based on the principles disclosed herein. The example GUIs may be generated in a smartphone application. For example, FIG. 4A shows an example GUI 400*a* that shows a current job list 402. FIG. 4B shows an example GUI 400*b* that allows the user to define a new job 404. FIG. 4C shows an example GUI 400*c* after the new job has been defined and set as a current job 406. FIG. 4D shows an example GUI 400*d* with a window 408 for setting up configuration parameters for a testing device. FIG. 4E shows an example GUI 400*e* that shows a first window 410 with the current job and a second window 412 with the job list.

Figure 5A:
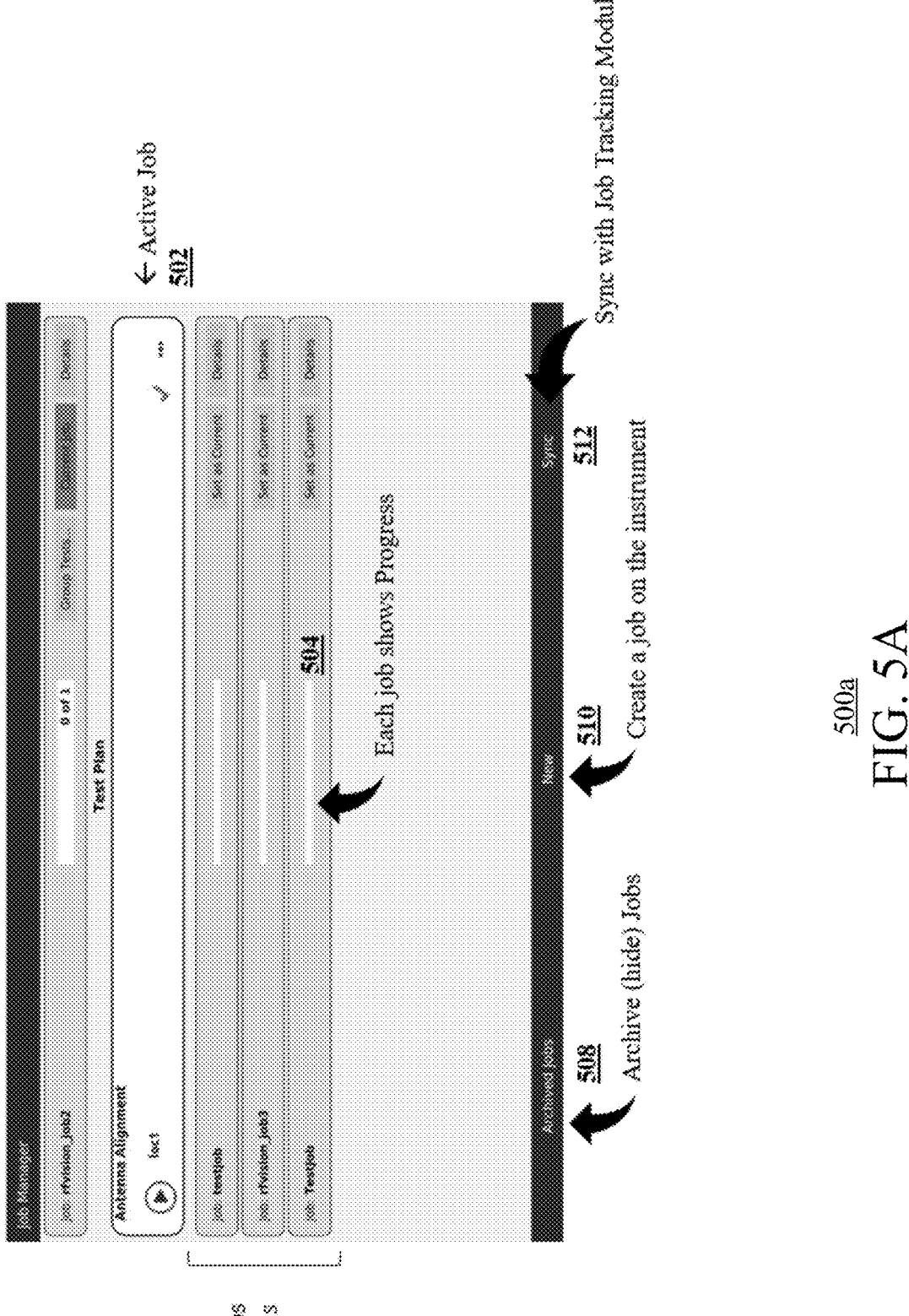
FIGS. 5A-5C show example GUIs generated by a testing device based on the principles disclosed herein.
Figure 5B:
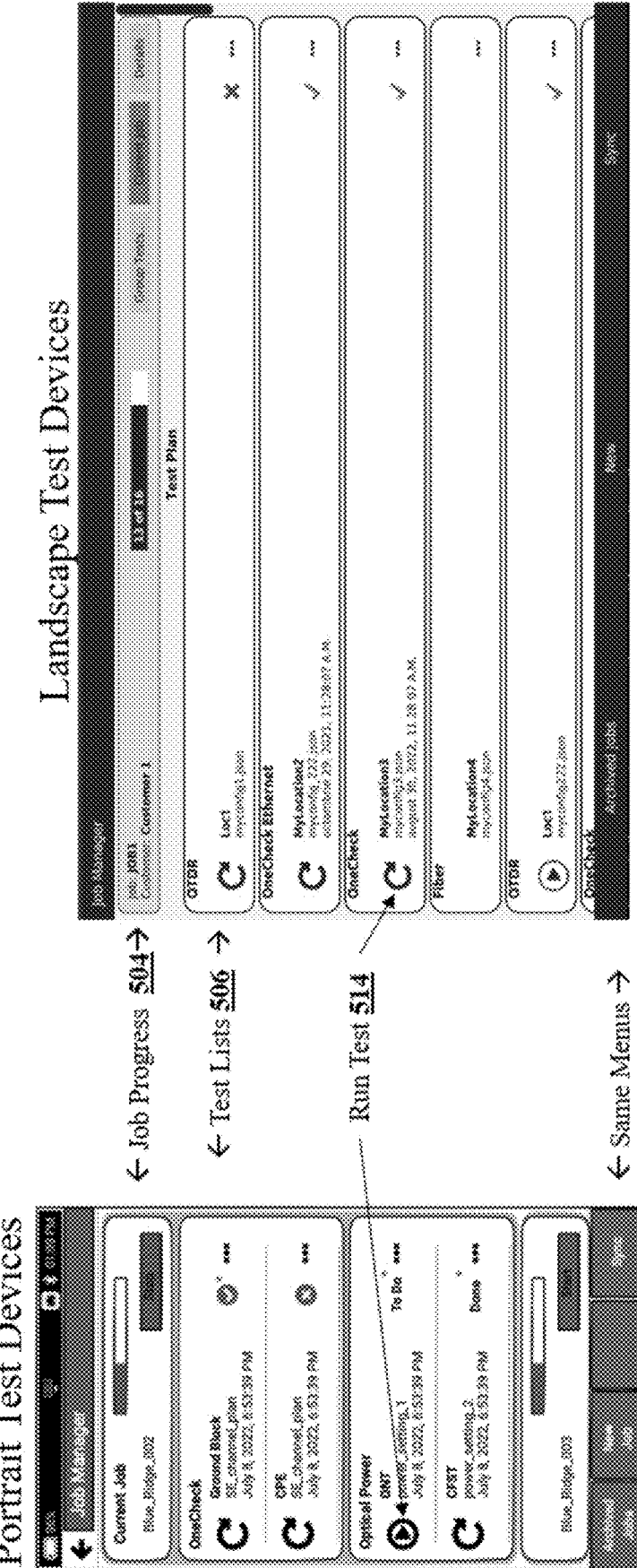
Figure 5C:
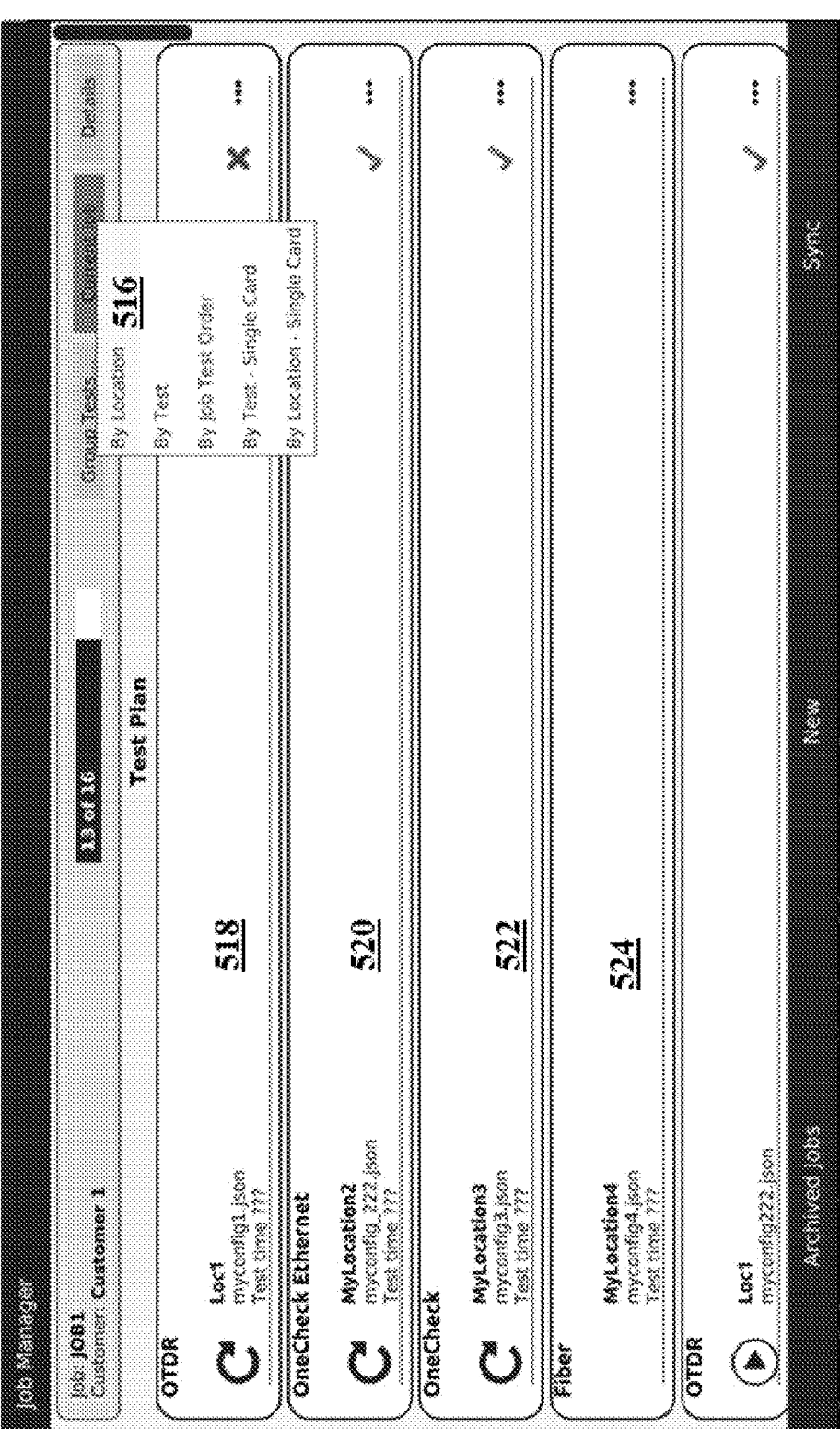

FIGS. 5A-5C show example GUIs generated by a testing device 106 based on the principles disclosed herein. For example, FIG. 5A shows an example GUI 500*a* during a performance of an active job 502. In addition to the active job 502, the GUI 500*a* also shows a full list of jobs 506 assigned to the technician associated with the testing device 106. Furthermore, progress bars (one progress bar is labeled as 504 as an example) show the progress of the corresponding jobs. Additionally, a selectable object 508 allows the technician to archive (hide) the shown jobs. Another selectable object 510 allows for a new job to be created via the testing device 106 itself. Yet another selectable object 512 allows for the testing device to be synched with the job tracking module 104. FIG. 5B shows example GUIs 500*b* that may be rendered in a portrait test device or a landscape test device. As with the GUI 500*a*, the GUIs 500*b* also show test lists 506 and progress bars 504. Furthermore, the GUIs 500*b* show selectable objects 514 to run the corresponding test. FIG. 5C shows an example GUI 500*c* that allows a technician to group the different tests. Particularly, a drop-down menu 516 may provide different options for the grouping. In the shown embodiment, a grouping by location is selected from the drop-down menu 516. Therefore, the GUI 500*c* shows tests for a first location 518, tests for a second location 520, tests for a third location 522, and tests for a third location 524.

Figure 6:
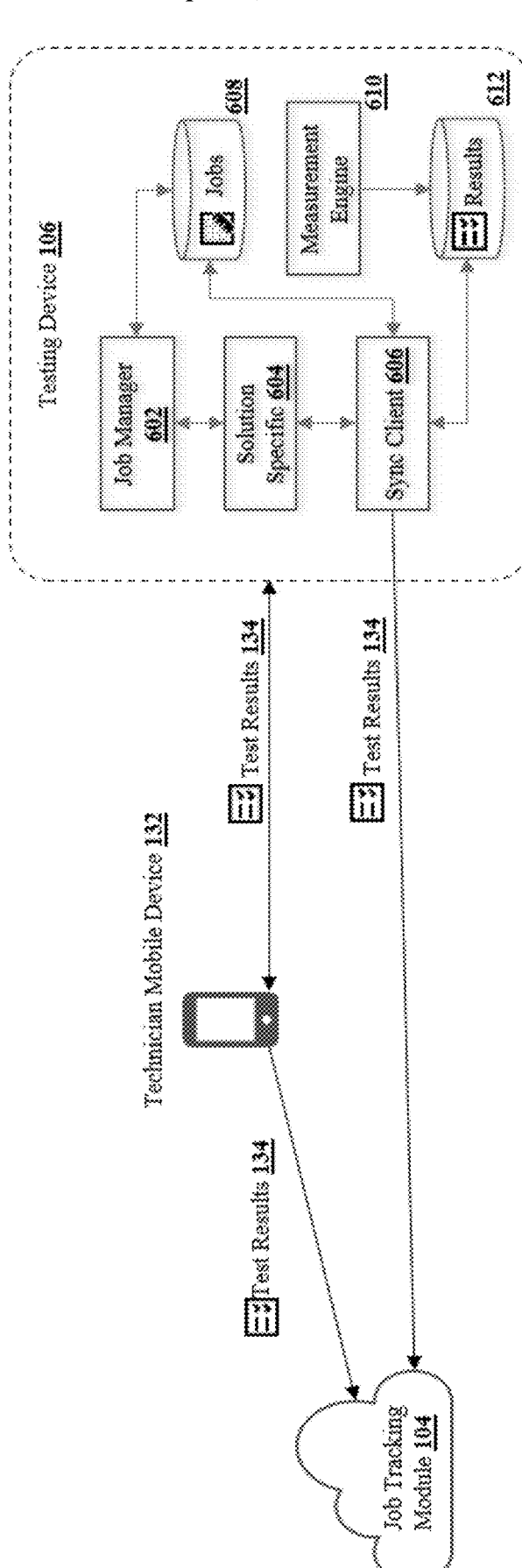
FIG. 6 shows an example architecture for performing a job based on the principles disclosed herein.

FIG. 6 shows an example architecture 600 for performing a job based on the principles disclosed herein. It should be understood that the architecture 600 and its components are merely illustrated examples and should not be considered limiting. That is, architectures with additional, alternative, or fewer number of components should be considered within the scope of this disclosure. As shown, the architecture 600 generally includes a job tracking module 104, a technician mobile device 132, and a testing device 106.

The testing device 106 includes a job manager 602, a solution specific module 604, a sync client module 606, a jobs repository 608, a measurement engine 610, and a results repository 612. The job manager 602 may aggregate, prioritize, or otherwise organize the several jobs to be performed by the testing device 106. The job manager 602 may further allow a technician to accept and or define a new job. The solution specific module 604 may allow the technician to provide a solution specific parameter to the current job. For example, the technical may enter configuration setting that is required for the current job. The sync client module 606 may sync the data of the testing device 106 with the job tracking module 104. The jobs repository 608 may store a list of jobs being performed or to be performed by the testing device 106. The measurement engine 610 may perform one or more measurements associated with the various tests. The results repository 612 may store the test results 134. In the embodiments where the testing device 106 has direct connectivity with the job tracking module 104, the test results 134 are sent directly the job tracking module 104. In the embodiments where the testing device 106 does not have a direct connectivity to the job tracking module, the test results 134 are sent to the job tracking module 104 through the technician mobile device 132.

Figure 7:
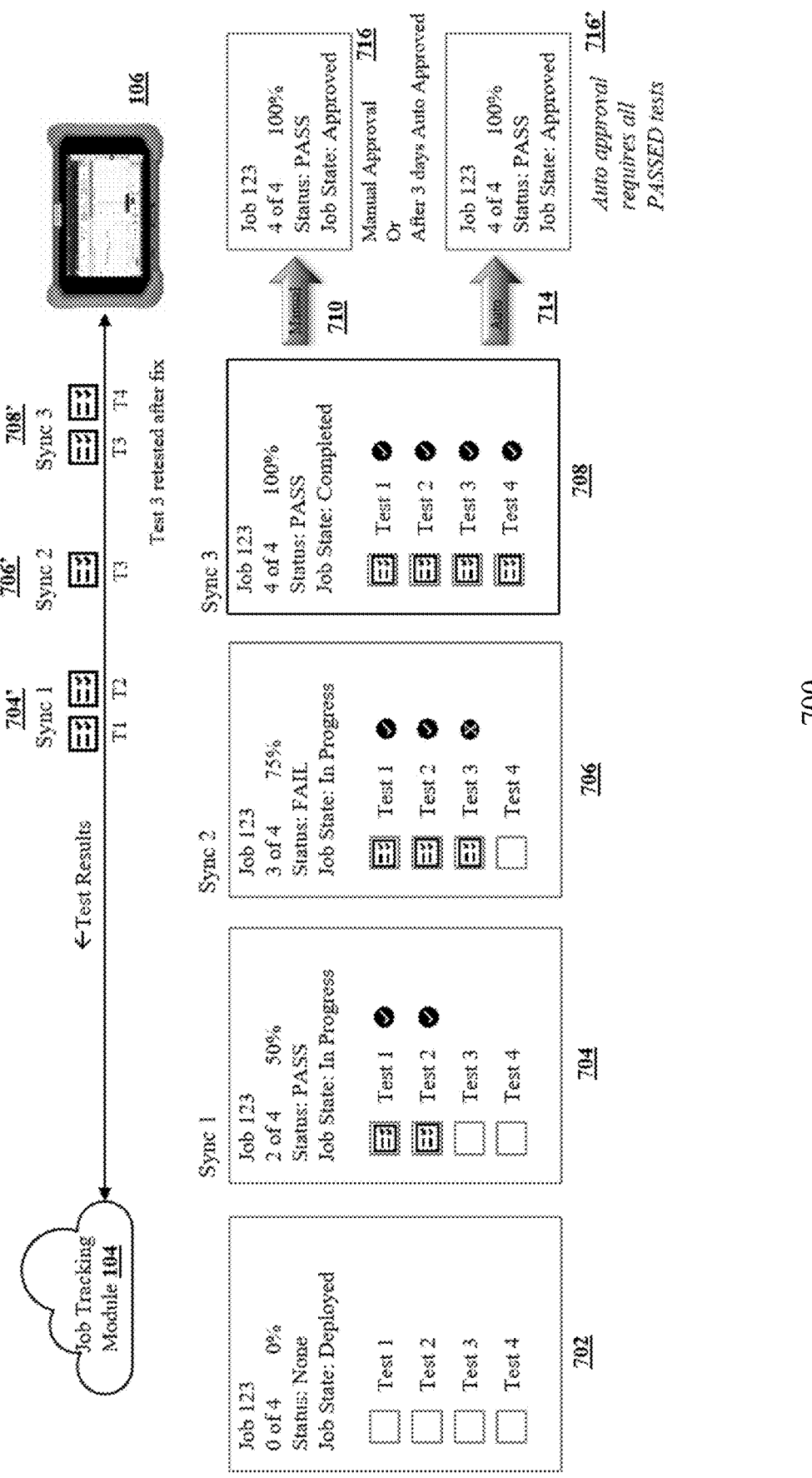
FIG. 7 shows a flow diagram of an example job completion process based on the principles disclosed herein.

FIG. 7 shows a flow diagram of an example job completion process 700 based on the principles disclosed herein. It should be understood that the various steps forming the process 700 are intended as examples and should not be considered limiting. That is, processes with alternative, additional, or fewer number of steps should be considered within the scope of this disclosure.

At step 702, a job consisting of four tests is defined. The job may be defined by a job tracking module 104 with the tests to be performed by a testing device 106. At step 704, test 1 and test 2 have been successfully performed. Step 704 also comprises a first sync of the testing device 106 with the job tracking module 104 (identified as 704' in FIG. 7). At step 706, test 3 is performed but it fails. Step 706 comprises a second sync of the testing device 106 with the job tracking module 104 (identified a 706' in FIG. 7). At step 708, all the four tests have been performed. Step 708 comprises a third sync of the testing device 106 with the job tracking module 104 (identified a 708' in FIG. 7). Because the third test failed in step 706, a desired fix is performed, and the third test is retested in step 708. After all the tests have passed successfully, a manual approval process 710 is performed to change the job status to an approved job status 716. If a manual approval 710 is not performed within a predetermined amount of time (e.g., three days), an auto approval process 716' is performed to change to the approved job status 716.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A test process automation system for a network, the system comprising:

one or more computers configured to execute a job tracking module;

a plurality of testing devices configured to perform a corresponding plurality of tests in the network;

the job tracking module being configured to generate a user interface to allow a supervisory user to define a job comprising a set of network tests to be performed by a set of testing devices from the plurality of testing devices, the job tracking module being configured to assign the job to the set of testing devices in response to determining that the set of testing devices has required configuration parameters;

the set of testing devices being configured to download and perform the set of network tests, and further configured to transmit corresponding test results to the job tracking module; and the job tracking module being configured to determine whether the set of network tests have been successfully completed based on the test results.

2. The system of claim 1, wherein the set of testing devices are configured to download the set of network tests directly from the job tracking module and are further configured to transmit the corresponding test results directly to the job tracking module.

3. The system of claim 1, wherein at least one testing device is configured to download a corresponding network test from a mobile device that has a direct connectivity to the one or more computers and is further configured to transmit a corresponding test result to the mobile device.

4. The system of claim 1, wherein the job tracking module is further configured to generate a second user interface that shows a progress status of the defined job.

5. The system of claim 1, wherein the job tracking module is configured to allow assignment of the job to the set of testing devices.

6. The system of claim 1, wherein the job tracking module is configured to assign the job to a set of technicians associated with the set of testing devices.

7. The system of claim 1, wherein the job tracking module is configured to periodically perform a sync operation with the set of testing devices.

8. The system of claim 1, wherein at least one testing device is configured to request at least one network test to be assigned from the job tracking module.

9. The system of claim 1, wherein the job tracking module is configured to define the job using a template.

10. A method comprising:

generating, by a job tracking module, a user interface to allow a supervisory user to define a job comprising a set of network tests to be performed by a set of testing devices;

assigning, by the job tracking module, the job to the set of testing devices in response to determining that the set of testing devices has required configuration parameters;

downloading and performing, by the set of testing devices, the set of network tests;

transmitting, by the set of testing devices, corresponding test results to the job tracking module; and determining, by the job tracking module, whether the set of network tests have been successfully completed based on the test results.

11. The method of claim 10, wherein downloading the set of network tests comprises:

downloading, by the set of testing devices, the set of network tests directly from the job tracking module; and wherein transmitting the corresponding test results comprises:

transmitting the corresponding test results directly to the job tracking module.

12. The method of claim 10, further comprising:

downloading, by at least one testing device, a corresponding network test from a mobile device that has a direct connectivity to the job tracking module; and transmitting, by the at least one testing device, a corresponding test result to the mobile device.

13. The method of claim 10, further comprising:

generating, by the job tracking module, a second user interface that shows a progress status of the defined job.

14. The method of claim 10, further comprising:

assigning, by the job tracking module, the job to the set of testing devices.

15. The method of claim 10, further comprising:

assigning, by the job tracking module, the job to a set of technicians associated with the set of testing devices.

16. The method of claim 10, further comprising:

periodically performing, by the job tracking module, a sync operation with the set of testing devices.

17. The method of claim 10, further comprising:

requesting, by at least one testing device, at least one network test to be assigned from the job tracking module.

18. The method of claim 10, further comprising:

defining, by the job tracking module, the job using a template.

* * * * *